(12) United States Patent
Atluri et al.

(10) Patent No.: US 7,698,401 B2
(45) Date of Patent: Apr. 13, 2010

(54) SECONDARY DATA STORAGE AND RECOVERY SYSTEM

(75) Inventors: Rajeev Atluri, Corona, CA (US); Anup S. Tirumala, San Jose, CA (US); Sam Inala, Belmont, CA (US); Srinivasarao Neelamraju, Pleasanton, CA (US); Srihari Sampath Kumar, Sunnyvale, CA (US)

(73) Assignee: Inmage Systems, Inc, Santa Clara, CA (US)

( * ) Notice: Subject to any disclaimer, the term of this patent is extended or adjusted under 35 U.S.C. 154(b) by 1348 days.

(21) Appl. No.: 10/859,368

(22) Filed: Jun. 1, 2004

(65) Prior Publication Data

US 2006/0031468 A1 Feb. 9, 2006

(51) Int. Cl.
*G06F 15/173* (2006.01)
(52) U.S. Cl. ............... 709/223; 709/213; 709/216; 709/220; 709/229; 709/237; 709/249
(58) Field of Classification Search ............ 709/213, 709/216, 223, 229, 249, 220, 237
See application file for complete search history.

(56) References Cited

U.S. PATENT DOCUMENTS

| | | | |
|---|---|---|---|
| 5,193,181 A | 3/1993 | Barlow et al. |
| 5,313,612 A | 5/1994 | Satoh et al. |
| 5,446,871 A | 8/1995 | Sholmer et al. |
| 5,621,882 A | 4/1997 | Kakuta |
| 5,664,189 A | 9/1997 | Wilcox et al. |
| 5,805,785 A | 9/1998 | Dias et al. |
| 5,875,479 A | 2/1999 | Blount et al. |
| 5,930,824 A | 7/1999 | Anglin et al. |
| 6,175,932 B1 | 1/2001 | Foote et al. |
| 6,247,141 B1 | 6/2001 | Homberg |
| 6,269,431 B1 | 7/2001 | Dunham |
| 6,324,654 B1 | 11/2001 | Wahl et al. |
| 6,327,579 B1 | 12/2001 | Crawford |
| 6,490,691 B1 | 12/2002 | Kimura et al. |
| 6,647,399 B2 | 11/2003 | Zaremba |
| 6,691,140 B1 | 2/2004 | Bogrett |
| 6,714,980 B1 | 3/2004 | Markson et al. |
| 6,742,139 B1 | 5/2004 | Forsman et al. |

(Continued)

FOREIGN PATENT DOCUMENTS

WO WO-2004021677 A1 3/2004

OTHER PUBLICATIONS

U.S. Appl. No. 11/438,401, filed Dec. 6, 2007, Atluri et al.

(Continued)

*Primary Examiner*—Liangche A Wang
(74) *Attorney, Agent, or Firm*—Raj Abhyanker, LLP

(57) ABSTRACT

A system for providing secondary data storage and recovery services for one or more networked host nodes has a server application for facilitating data backup and recovery services; at least one client application for facilitating host node configuration to receive services; a secondary data storage medium; and at least one mechanism for passive acquisition of data from the one or more host nodes for storage into the secondary data storage medium by the server application. In a preferred embodiment secondary storage is streamlined through continuous data backup and enhanced by elimination of redundant write data.

31 Claims, 8 Drawing Sheets

U.S. PATENT DOCUMENTS

| | | | |
|---|---|---|---|
| 6,833,073 | B2 | 12/2004 | Agarwal |
| 6,915,315 | B2 | 7/2005 | Autrey et al. |
| 6,981,177 | B2 | 12/2005 | Beattie |
| 7,058,849 | B2 * | 6/2006 | Erstad ............................ 714/5 |
| 7,093,086 | B1 | 8/2006 | Rietschote |
| 7,155,586 | B1 | 12/2006 | Wagner et al. |
| 7,165,156 | B1 | 1/2007 | Cameron et al. |
| 7,206,911 | B2 * | 4/2007 | Wolfgang et al. ........... 711/162 |
| 7,237,021 | B2 * | 6/2007 | Penny et al. ................. 709/223 |
| 7,251,749 | B1 | 7/2007 | Fong et al. |
| 7,254,682 | B1 | 8/2007 | Arbon |
| 2002/0008795 | A1 | 1/2002 | Koyama et al. |
| 2002/0124013 | A1 | 9/2002 | Loy et al. |
| 2003/0093579 | A1 | 5/2003 | Zimmer et al. |
| 2004/0006723 | A1 * | 1/2004 | Erstad ......................... 714/15 |
| 2004/0031030 | A1 | 2/2004 | Kidder et al. |
| 2004/0093474 | A1 | 5/2004 | Lin et al. |
| 2004/0199515 | A1 * | 10/2004 | Penny et al. .................. 707/10 |
| 2004/0205390 | A1 | 10/2004 | Kanevsky et al. |
| 2005/0010835 | A1 | 1/2005 | Childs et al. |
| 2005/0033930 | A1 | 2/2005 | Haruma et al. |
| 2005/0044162 | A1 | 2/2005 | Liang et al. |
| 2005/0050386 | A1 | 3/2005 | Reinhardt et al. |
| 2005/0055603 | A1 | 3/2005 | Soran et al. |
| 2005/0138090 | A1 | 6/2005 | Augenstein et al. |
| 2005/0138204 | A1 | 6/2005 | Iyer et al. |
| 2005/0182953 | A1 | 8/2005 | Stager et al. |
| 2005/0188256 | A1 | 8/2005 | Stager et al. |
| 2005/0198303 | A1 | 9/2005 | Knauerhase et al. |
| 2005/0223181 | A1 * | 10/2005 | Jeppsen et al. ............... 711/162 |
| 2005/0240792 | A1 | 10/2005 | Sicola et al. |
| 2005/0251540 | A1 | 11/2005 | Sim-Tang |
| 2005/0257085 | A1 | 11/2005 | Haustein et al. |
| 2005/0262097 | A1 | 11/2005 | Sim-Tang et al. |
| 2005/0262377 | A1 | 11/2005 | Sim-Tang |
| 2005/0267920 | A1 | 12/2005 | Helliker et al. |
| 2006/0031468 | A1 | 2/2006 | Atluri et al. |
| 2006/0047714 | A1 | 3/2006 | Anderson et al. |
| 2006/0114497 | A1 | 6/2006 | Anderson et al. |
| 2006/0149793 | A1 | 7/2006 | Kushwah et al. |
| 2006/0155912 | A1 | 7/2006 | Singh et al. |
| 2006/0218434 | A1 | 9/2006 | Solhjell |
| 2007/0038998 | A1 | 2/2007 | Fries |
| 2007/0168404 | A1 | 7/2007 | Nakamura et al. |
| 2007/0244938 | A1 | 10/2007 | Michael et al. |

OTHER PUBLICATIONS

U.S. Appl. No. 11/438,036, filed Nov. 22, 2007, Atluri.

U.S. Appl. No. 11/229,289, filed Jan. 12, 2006, Atluri.

Neel, D., "Symantec Says It'll Put Data on Road to Recovery—New LiveState Une Promises Complete System Restoration," Computer Reseller News, Oct. 4, 2004, 12.

Kador, J., .Open Middleware: The Next Generation in Distributed Computing, Midrange Systems, Nov. 25, 1994, v.7, n.22, pS12(4).

Data Protection—Perform Zero Downtime Backups [online Jan. 29, 2009]. Retrieved from the Internet URL: http://stage.hp.resource.com/sbso/bus_protect/data_protect/zero_downtime.

HP Open View Storage Data Protector 5.1 Software [online] [retrieved on Jan. 29, 2009]. Retrieved from the Internet URL: http://www.hp.com/products1/storage/pdfs/media/OVDPds2.pdf.

Storagecraft Technology Corporation: Protecting Windows Servers and PCs with Fast and Reliable Online Backup and Bare Metal Recovery Solutions [online] [retrieved on Jan. 29, 2009]. Retrieved from the Internet URL: http://www.rmwtug.org/Talks/ShadowStor/ShadowProtectdsheet.pdf.

* cited by examiner

SECONDARY DATA STORAGE AND RECOVERY SYSTEM

FIELD OF THE INVENTION

The present invention is in the field of data storage and recovery systems and pertains particularly to a system for aggregating and organizing data for efficient secondary data storage and recovery.

BACKGROUND OF THE INVENTION

In the field of data storage and recovery, storage area networks (SANs) are being used more and more frequently to store data because of their high speed, reliability, and relative fault tolerance characteristics.

A SAN is a high-speed network that separates storage traffic from other types of network traffic. Prominent standards used in data storage in conventional art are Small Computer Systems Interface (SCSI), Fibre Channel (FC), SAS and ATA/SATA. The redundant array of independent disks (RAID) standard is used for creating fault tolerant data storage.

State-of-the-art storage systems comprise a SAN network of storage devices and host nodes, in many instances connected together by a Fibre Channel (FC) switch. There are other variations of SAN architecture that use a different transport protocol such as high speed Ethernet in place of the FC protocol for the storage network.

In addition to the above, late-developing enhancements such as iSCSI and Fibre Channel over Internet protocol (FCIP) have enabled data storage networks to be managed as two or more networked SAN storage islands connected into a larger network by an IP tunnel. In these cases, which are not yet widely practiced, TCP/IP is leveraged as well as encapsulation (frame packaging) methods to enable data storage devices to communicate with each other efficiently over the Internet in a dedicated manner.

In typical application data generated by nodes on a host network is written to a primary storage on a SAN. Data from the primary storage system is then typically archived or backed up to a tape media in a batch-mode fashion at the end of a work period. Typically, a larger number of data-generating machines in a host network, like PCs and servers, back up the data to a smaller number of mass storage devices like a tape library. For many applications leveraging an off-site storage solution, data written to a primary storage system is transferred to one or more tape drive systems as described above for archiving to magnetic tape media, which can be securely stored off-location on behalf of an enterprise.

A typical problem with the backup operation (writing the data to tape) is that data generated from some machines during any work period can be of a very large volume and can take considerably longer to back-up than data from other machines. The backup window for a specific host can range anywhere from 30 minutes to 48 hours and above depending on the volume of data changes generated.

Another problem is that the backup data is sent from the host nodes to the tape drive over the LAN. Rendering the data from RAID to tape is typically done in a manually orchestrated batch mode operation performed by an administrator with the help of backup software. Under these conditions the operating host data network (LAN) must share bandwidth with the components involved in securing the backup data to tape media.

Yet another limitation with prior art systems is that if a data recovery operation is required, wherein the data desired is already archived to tape media, the recovery process is comparatively much slower than, for example, recovery of near-term data from a hard-drive disk.

There are still more limitations are apparent with practices of prior art storage and backup systems. For example, with prior art data backup software data movement is from each of the hosts. Moreover, most prior art backup systems perform backup operations at the file level in a non continuous fashion, which can cause additional disk seeks to find out which files have actually changed by the scheduled backup time.

What is needed in the art is a method and apparatus for archiving data to a backup data-storage sub-system that solves the above problems.

SUMMARY OF THE INVENTION

A system for providing secondary data storage and recovery services for one or more networked host nodes is provided. The system includes a server application for facilitating data backup and recovery services, at least one client application for facilitating host node configuration to receive services, a secondary data storage medium and at least one mechanism for passive acquisition of data from the one or more host nodes for storage into the secondary data storage medium by the server application.

In one embodiment, the networked host nodes are connected to a LAN. In this embodiment the host nodes are a mix of PCs and server nodes. In one embodiment, the system is implemented in conjunction with a SAN and to the LAN hosts through a Fibre Channel switch. In another embodiment, the system is implemented in conjunction with a SAN and the LAN hosts through an Ethernet hub.

In a preferred embodiment, the secondary storage medium is one of a serial-advanced-technology-attachment (SATA) or parallel-advanced-technology-attachment (PATA) drive system. In this embodiment, the mechanism for data acquisition from the hosts is a data path splitter installed one per data path existing between the one or more hosts and a primary storage system. Also in this embodiment, the primary storage system is SAN-based and accessible to the one or more hosts through a Fibre Channel switch or through an Ethernet hub. In one embodiment, the client application includes a component for creating and sending metadata along with physical data for secondary storage backup.

In one embodiment, the server application includes a component for receiving data from the data acquisition mechanism, a component for validating the write portion of the data received using metadata comparison of received metadata with stored metadata, and a component for compressing the validated data for write to the secondary storage medium. In this embodiment, the component for receiving data from the data acquisition mechanism is a line card dedicated as receive only. Also in one embodiment, the system further includes a tape-drive system for long term backup of secondary storage data.

According to another aspect of the invention, a software suite for providing secondary storage and recovery services to a plurality of networked nodes is provided. The software suite includes a portion thereof for configuring network nodes for services, a portion thereof for ordering services and for generating metadata about data generated for secondary storage, a portion thereof for providing data write validation, and a portion thereof for receiving data and for preparing the received data for storage.

In one embodiment, the portions for service configuration, ordering and for metadata generation are part of a client instance provided one instance per to the networked nodes. In a preferred embodiment, the portions for receiving and validating data and for storing the data are part of a server application provided to a hardware host connected to a secondary storage medium and to an interface to the networked nodes.

In one embodiment, the hardware host is a PC node. In another embodiment, the hardware host is a dedicated server box. In one embodiment, the portion for preparing the data for storage to secondary storage controls a cache memory system in the hardware host. Also in one embodiment, the portions for data validation and preparing data for secondary storage include a data table search utility, a data compression utility coupled with a sparse file utility.

In another embodiment, a portion of the server application comprises firmware installed on an FPGA supported by a line card. In this embodiment, the firmware includes a frame rate detection engine for adjusting performance of the card functions to actual frame rate of data being received on the card.

According to yet another aspect of the invention, a method for passive acquisition and write validation of data generated by one or more networked host nodes for secondary storage in a SAN-based data storage and recovery network is provided. The method includes steps for (a) generating data for primary storage; (b) generating metadata describing the data generated for primary storage; (c) sending the data and metadata to a primary SAN storage device; (d) acquiring passive access to data traveling the data path between the generating node and the primary SAN device the data mirrored over the access line to a secondary storage server; (e) receiving, at the secondary storage server, an exact copy of the data stream that passes the splitter; and (f) comparing metadata sent with the actual data against locally stored metadata to validate or invalidate the write data.

In one aspect, in step (a) the data is generated by a LAN connected PC or a dedicated server node. In a preferred aspect, in step (a) the primary storage medium is a RAID unit accessible through a network switch. In this aspect, in step (a) the network switch is a Fibre Channel switch or an Ethernet hub. Also in a preferred aspect, in step (b) the metadata describes at least the ID of the generating node, the destination ID of the primary storage device, the offset location in primary storage allocated for write, and the length of the payload.

In one aspect, in step (b) the metadata further describes checksum data. In another aspect, in step (c) the data is sent as a series of data frames conforming to a SCSI protocol. In still another aspect, in step (c) the data is sent as a series of data frames conforming to an Ethernet protocol.

In preferred aspects, in step (d) data path splitting is achieved using a hardware data splitter of an optical type or of an electrical type depending on the type of network line used. Also in preferred aspects, in step (e) the server is a dedicated server node and the data is received at a line card installed in the server, the line card specially adapted only to passively receive the data.

In one aspect, in step (e) the server is a PC node and the data is received on a network adaptor card. In one aspect, in step (f) metadata comparison is performed on a line card adapted to receive the data. In another aspect, in step (f) metadata comparison is performed in a cache system.

BRIEF DESCRIPTION OF THE DRAWING FIGURES

DESCRIPTION OF THE PREFERRED EMBODIMENTS

The present invention in varying embodiments provides a method and apparatus for enhancing near-term and long-term data storage in a SAN-based architecture. The methods and apparatus of the present invention are described in enabling detail in various embodiments described below.

Figure 1:
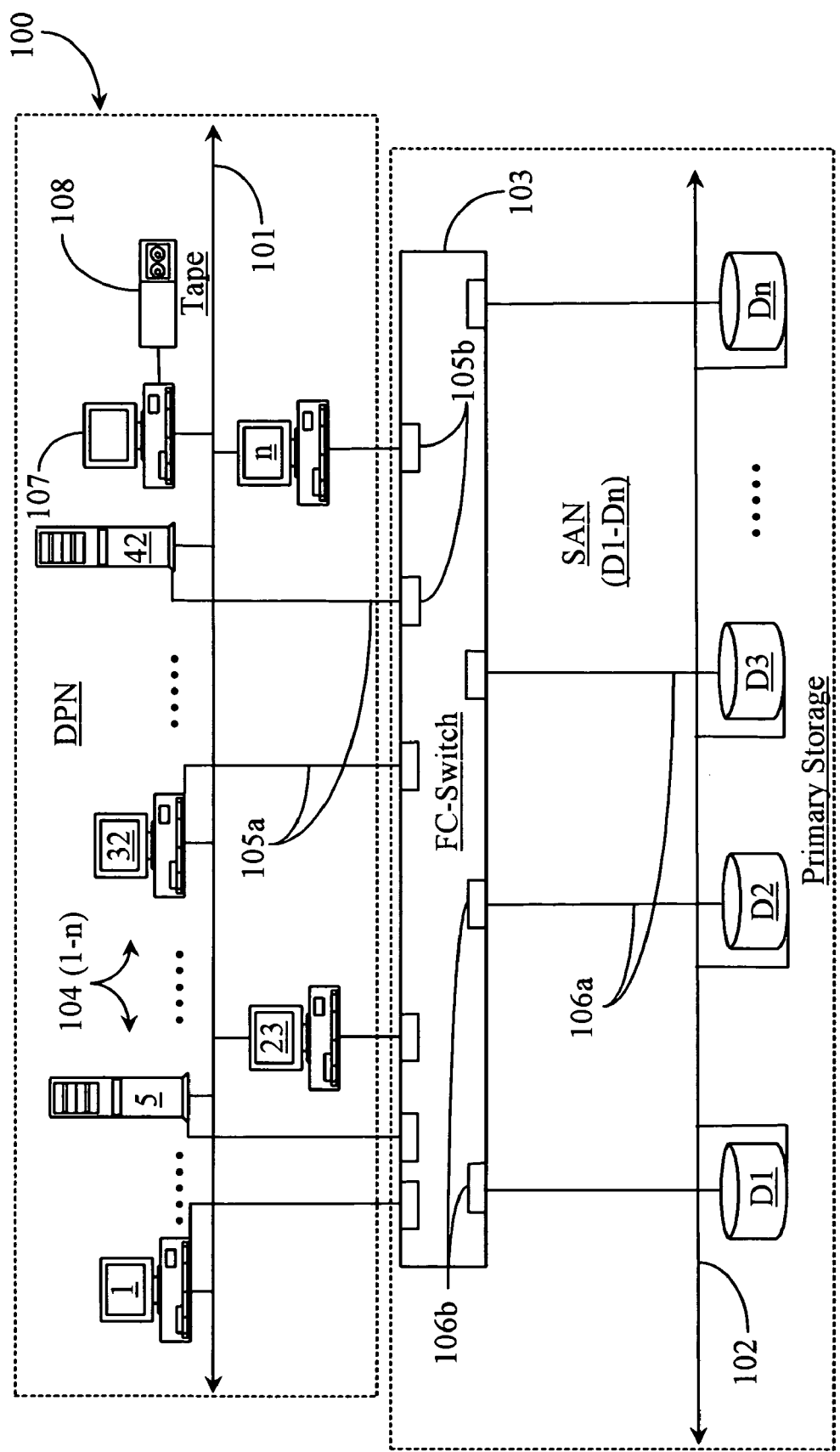
FIG. 1 is an architectural view of a typical SAN-based data storage and recovery network according to prior art.

FIG. 1 is an architectural view of a typical SAN-based data-storage and recovery network according to prior art. A data-packet-network (DPN) 100 is illustrated in this example and is typically configured as a local-area-network (LAN) supporting a plurality of connected nodes 104 (1-n). DPN 100 may be an IP/Ethernet LAN, an ATM LAN, or another network type such as wide-area-network (WAN) or a metropolitan-area-network (MAN).

For the purpose of this example assume DPN 100 is a LAN network hosted by a particular enterprise. LAN domain 100 is further defined by a network line 101 to which nodes 104 (1-n) are connected for communication. LAN domain 100 may be referred to herein after as LAN 101 when referring to connective architecture. There may be any arbitrary number of nodes 104(1-n) connected to LAN cable 101. Assume for the purposes of this example a robust LAN connecting up to 64 host nodes. Of these, nodes 1, 5, 23, 32, 42, and n are illustrated. A node that subscribes to data back-up services is typically a PC node or a server node. Icons 1, 23, 32, and n represent LAN-connected PCs. Icons 5 and 42 represent LAN-connected servers. Servers and PCs 104 (1-n) may or may not have their own direct access storage (DAS) devices, typically hard drives.

A PC node 107 is illustrated in this example and is reserved for archiving back-up data to a tape drive system 108 for long-term storage of data. An administrator familiar with batch-mode data archiving from disk to tape typically operates node 107 for tape backup purposes.

Network 100 has connection through a FC switch 103, in this case, to a SAN 102 of connected storage devices D1-Dn (Disk 1, Disk n). Collectively, D1-Dn are referred to herein as primary storage. SAN domain 102 is further defined by SAN network link 109 physically connecting the disks together in daisy-chain architecture. D1-Dn may be part of a RAID system of hard disks for example. FC switch 103 may be considered part of the SAN network and is therefore illustrated within the domain of SAN 102. In some cases an Ethernet switch may replace FC switch 103 if, for example, network 109 is a high-speed Ethernet network. However, for the purpose of description here assume that switch 103 is an FC switch and that network 109 functions according to the FC system model and protocol, which is well known in the art.

Each node 104 (1-n) has a host bus adapter (not shown) to enable communication using FCP protocol layered over FC protocol to FC switch 103 in a dedicated fashion. For example, each connected host that will be backing up data has a separate optical data line 105a in this example connecting that node to a port 105b on switch 103. Some modes may have more that one HBA and may have multiple lines and ports relevant to switch 103. For the purpose of example, assume 64 hosts and therefore 64 separate optical links (Fiber Optic) connecting the hosts to switch 103. In another embodiment however the lines and splitters could be electrical instead of optical.

FC switch 103 has ports 106b and optical links 106a for communication with primary storage media (D1-Dn). Fabric in switch 103 routes data generated from certain hosts 104 (1-n) in DPN 100 to certain disks D1-Dn for primary data storage purposes as is known in RAID architecture. Data is stored in volumes across D1-Dn according to the RAID type that is applied. Volumes may be host segregated or multiple hosts may write to a single volume. D1-Dn are logically viewed as one large storage drive. If one host goes down on the network, another host may view and access the volume of data stored for the down host. As is known, under certain RAID types some of the disks store exact copies of data written to primary storage using a technique known as data striping. Such storage designations are configurable.

There will likely be many more ports on the north side of FC switch 103 (facing LAN hosts) than are present on the south side of FC switch 103 (facing primary storage). For example, each host node may have a single HBA (SCSI controller). Each physical storage device connected to SAN network 109 has a target device ID or SCSI ID number, each of which may be further divided by an ID number referred to in the art as a logical unit number (LUN). In some cases a LUN, or device ID number can be further broken down into a sub-device ID or sub logical unit number (SLUN) although this technique is rarely used.

In prior art application when a host node, for example node 104 (1), writes to primary storage; the actual write data is transmitted to one of ports 105b over the connected fiber optic line 105a. From port 105b the data is routed to one of ports 106b and then is transmitted to the appropriate disk, D1, for example. FC transport protocols, including handshake protocols are observed. All data written from host 1, for example, to primary storage D1 comprises data that is typically stored in the form of data blocks. Data generated by hosts is typically written to primary storage in a buffered fashion for performance reasons, however most systems support unbuffered writes to primary storage for reliability reasons.

At the end of a work period, data and the changes to it that have been stored in primary storage disks D1-Dn may be transferred or copied to longer-term tape media provided by tape drive 108. Operating node 107, an administrator copies data from D1-Dn and writes the data to tape drive 108. Each host sends over the data and or its changes for one or more volumes. The data changes have to be computed before they can be sent as they are not tracked continuously, therefore, backup operations are typically performed in batch mode, queuing volumes and or files for one or more hosts, and so on until all hosts 104 (1-n) have been completely backed up to tape media. Each node has a backup window or time it will take to completely preserve all of the data that previously existed and/or the changes that particular node generated in the work period. Typical time windows may range from 30 minutes for a PC to up two 2 days or more for a robust data server. An administrator must be paid to oversee the backup operations and in the case of large servers backup jobs may be ongoing taking all of the administrator's time.

One goal of the present invention is to eliminate the batch mode archiving requirements of data storage and recovery systems. A solution to the manual process can save considerable time and resource.

Figure 2:
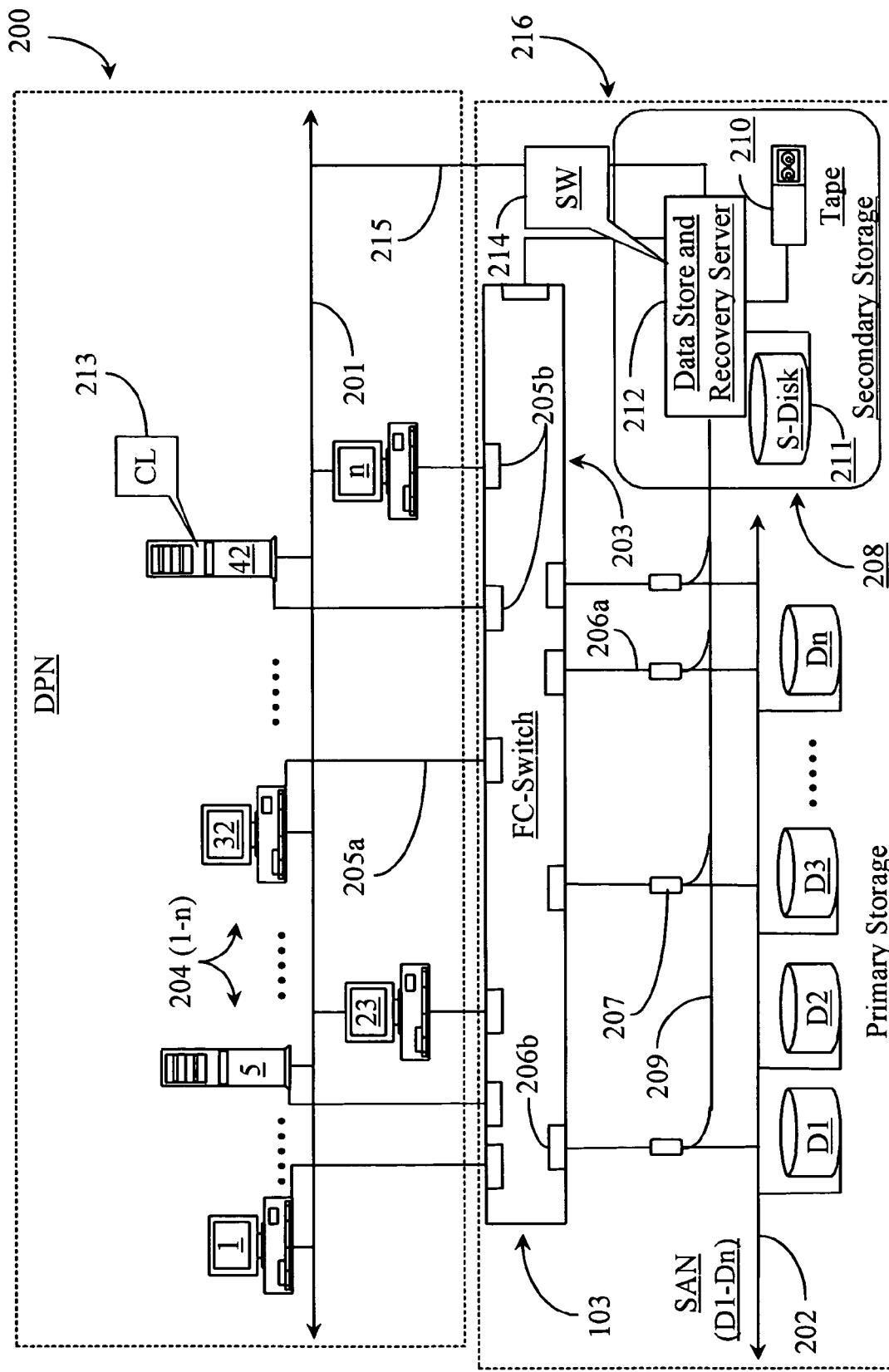
FIG. 2 is an architectural overview of a SAN-based data storage and recovery network according to an embodiment of the present invention.

FIG. 2 is an architectural overview of a SAN-based storage and recovery network according to an embodiment of the present invention. A DPN 200 is illustrated in this embodiment. DPN 200 may be an Ethernet LAN, TCP/IP WAN, or metropolitan area network (MAN), which may be a wireless network. For purpose of discussion assume that DPN 200 is a network similar in design and technology to that of LAN domain 100 described above with references to FIG. 1. An exception to the similarity is that there is no tape drive system or a connected administrator node for controlling tape archiving operations maintained on the north side of the architecture.

LAN domain 200 is further defined in this embodiment by LAN cable 201 providing a physical communication path between nodes 204 (1-n). LAN domain 200 may hereinafter be referred to as LAN 201 when referring to connective architecture. Nodes 204 (1-n) are illustrated as connected to SAN-based FC switch 103 via optical paths 205a and ports 205b mirroring the physical architecture described further above. The SAN network is identified in this example as SAN 216. In this example, nodes 1-n each have an instance of client software (CL) 213 defined as a client instance of a secondary data storage and recovery server application described later in this specification.

Nodes 204 (1-n) in this example are a mix of PC-based and robust servers that may work in dedicated standalone mode and/or in cooperative fashion to achieve the goals of the enterprise hosting the LAN. For example, server 5 may be an email server and server 42 may be an application server sharing duties with one or more other servers. A common denominator for all of nodes 204 (1-n) is that they all, or nearly all, generate data that has to be backed up for both near term and long-term recovery possibilities in the event of loss of data. Nodes 204 (1-n) may or may not be equipped with direct access storage (DAS) drives.

Nodes 204 (1-n) have dedicated connection paths to SAN FC switch 103 through optical cables 205a and FC ports 205b in a typical architecture. In one embodiment of the present invention high-speed copper wiring may be used in place of fiber optic links. However in a preferred embodiment, the faster technology (fiber) is implemented. The exact number of nodes 204 (1-n) is arbitrary, however up to 64 separate nodes may be assumed in the present example. Therefore, there may be as many as 64 cables 205a and 64 ports 205b on the north side of FC switch 103 in the SAN connection architecture. Ports 205b on the north side may be assumed to contain all of the functionality and components such as data buffers and the like for enabling any one of nodes 201 (1-n) to forge a dedicated connection for the purpose of writing or reading data from storage through FC switch 103.

Ports 205b are mapped through the FC fabric to south side ports 206b. Ports 206b are each configured to handle more than one host and number less than the LAN-side ports 205b. One reason for this in a typical architecture is that a limited number of identifiable storage devices are supported on SAN domain 216, which is further defined by network cable 202. SAN domain 216 may also be referred to herein as SAN 202 when referring to physical connection architecture. D1-Dn may number from 2 to fifteen devices in this example; however application of LUNs can logically increase the number of "devices" D1-Dn that may be addressed on the network and may be written to by hosts. This should not be considered a limitation in the invention.

SAN 202 is connected to ports 206*b* on FC switch 103 by way of high-speed optical cabling (206*a*) as was described further above with reference to FIG. 1 with one exception. A secondary storage sub-system 208 is provided in one embodiment to operate separately from but having data access to the SAN-based storage devices D1-Dn. In a preferred embodiment System 208 includes a data-storage and recovery server 212 and at least one secondary storage medium (S-Disk) 211, which in this example, is a DAS system adapted as a SATA drive. In one embodiment disk 211 may be a PATA drive.

In this example, server 212 is a dedicated node external from, but directly connected to storage disk 211 via a high-speed data interface such as optical cable. In one embodiment of the present invention server 212 may be PC-based running server and storage software. Disk 211 is, in this example, an external storage device or system however, in another embodiment, it may be internal. In one embodiment of the present invention disk 211 may be logically created or partitioned from the primary storage system including D1-Dn on SAN 202. There are many possibilities.

Server 212 has a SW instance 214 installed thereon and executed therein. SW 214 is responsible for data receipt, data validation, data preparation for writing to secondary storage. SW 214 may, in one embodiment, be firmware installed in distributed fashion on line cards (not shown) adapted to receive data. In another embodiment, SW 214 is a mix of server-based software and line card-based firmware. More detail about the functions of instance 214 is given later in this specification.

Server 212 has a direct connection to FC switch 103 in this example and with some configuration changes to the FC switch 103 and or the primary storage system including D1-Dn has access to all data stored for all hosts in D1-Dn over SAN 202 and through the FC fabric. In this example, server 212 also has a direct LAN connection to LAN 201 for both data access and data sharing purposes and for system maintenance purposes. Server 212 can read from primary storage and can sync with primary storage in terms of volume data location offsets when booted up. However server 212 stores data differently from the way it is stored in primary storage.

System 208 includes a tape drive system 210 for archiving data for long-term recovery and storage. System 208 is responsible for providing a secondary storage medium that can be used independently from the primary storage D 1-Dn for enhanced near-term (disk) and long-term (tape) data backup for hosts 204 (1-n) operating on network 201.

In this example, data written from hosts to primary storage (D1-Dn) is split off from the primary data paths 206*a* (optical in this example) defining the dedicated host-to-storage channels. This is achieved in this example using a data path splitter 207 installed, one each, in the primary paths on the south side of FC switch 103 in this example. In this way system 208 may acquire an exact copy of all data being written to primary storage. Data mirrored from the primary data paths is carried on high-speed fiber optics lines 209, which are logically illustrated herein as a single data path in this example for explanation purposes only. In actual practice, server 212 has a plurality of line cards (not shown) installed therein; each card ported and assigned to receive data from one or more splitters.

In one embodiment, data path splitting is performed on the north side of FC switch instead of on the south side. In this case more splitters would be required, one for each data path like 205*a*. The decision of where in the architecture to install splitters 207 is dependent in part on the number of hosts residing on LAN 201 and the amount of overhead (if installed on the south side) needed to efficiently keep track of source and destination addresses for each frame carrying payload data passing the splitters.

Data is transparently split from primary host paths for use by server 208 to provide enhanced secondary data storage and recovery that greatly reduces the work associated with prior-art operations. Server 212, with the aid of SW 214 provides data storage for hosts onto disk 211 and automated archiving to tape media 210 in a continuous streaming mode as opposed to periodic data back up and tape-transfer operations performed in prior art systems. In one embodiment WAN data replication may be practiced instead of or in addition to tape archiving. For example, hosts 204(1-n) may be WAN-connected or WAN-enabled through a gateway. Data from disk 211 may be replicated for recovery purposes and sent over the WAN to a proxy system or directly to hosts. The data may be sent in pass through mode (lower level) where there are no application consistency features applied. In one embodiment recovery data may be replicated and sent to hosts in a time shot mode wherein application consistency measures are applied to the data.

In practice of the present invention according to the exemplary embodiment illustrated, a host, say host 5 for example, performs a save operation to a database. The save operation is considered a data write to primary storage. When the data hits splitter 207 after routing has been assigned to the appropriate storage device D1-Dn by FC switch 103, an exact copy is mirrored from the splitter (207) to server 212. Server 212 receives the data inline via dedicated line interface and performs in some embodiments unique data optimization techniques before writing the data sequentially to secondary disk 211.

In an alternate embodiment mirroring data from the primary paths of the hosts may be performed within FC switch 103; however modification of switch hardware would be required. Splitting data from either the north side or the south side of switch 103 can be performed using off-the shelf hardware requiring no modification to FC switch 103. In the physical link layer of the FC protocol model there is no discernable difference in splitting data at the north or south side of FC switch 103, however in subsequent protocol layers the characteristics thereof provide some motivations for performing data splitting, optimally, on south side of FC switch 103. Likewise, data may be split at the location of each host 204 (1-n) using similar means. In still another embodiment server 212 may wait and read any new data after it has been written to primary storage. However in this case, an overhead would be created comprising the number of extra reads performed by server 212. Splitting the data from primary data paths provides the least intrusive or passive method for obtaining the required data for secondary storage.

Host machines 204 (1-n) may have an instance of client SW (CL) 213 installed thereon and executable there from. CL 213 cooperates with SW 214 running on machine 212 to optimize data writing to secondary storage by helping to reduce or eliminate redundant data writes. Data storage and recovery server 212 keeps a database (not shown) of metadata describing all data frames received that are considered writes (having payloads for write) and optionally reads, the metadata describes at least the source address (IP or MAC), destination address, (LUN), frame sequence number, offset location, length of payload, and time received of each data frame that is copied thereto from the primary data paths from hosts 204 (1-n) to primary storage (D1-Dn). The metadata is used to validate write data. The technique is for ensuring against any data loss theoretically possible due to the split and lack of flow control that it implies. It also is used for reducing or eliminating secondary storage of redundant writes and requires cooperation, in one embodiment from hosts 204 (1-n) running instances of CL 213. In this way redundant writes, for example, of the same data whether created by a same or by separate hosts are not processed by server 212 before data is written to disk 211. Same writes by separate hosts are instead presented as one write identifying both hosts.

CL 213 in the above-described embodiment has a utility for creating the metadata descriptions for each pending write performed by the host server or PC. At each write, server 212 receives both the actual data and the associated metadata. The metadata for a set of received write frames is compared with metadata formerly acquired by server 212. A hit that reveals a same data checksums, length, order and other parameters for a payload indicates a redundant write or one where the data has not changed. More detail about this unique optimization technique is provided later in this specification.

Other techniques used by server 212 include the use of a sparse file utility as one layer of one or more compression techniques to optimize the speed of secondary storage to match that of primary storage devices and to facilitate faster data recovery to hosts in the event that it is required. Sparse file technology is based on avoiding storing of unused data blocks. Storage is more efficient because no physical storage space is allocated for portions of the file that do not contain data.

In a preferred embodiment of the present invention, server 212 facilitates writing to secondary data storage in near real time in significantly larger sequential streams than would be possible if the input data itself were written per its normal characteristics. Also in a preferred embodiment of the invention stored data aging past a reasonable time window, perhaps 30-120 days, is archived to tape or other long-term storage media in an automated fashion per flexible policy settings. In still another enhancement to the way data is stored, server 212 is adapted in a preferred embodiment to write data to disk 211 is a sequential fashion instead of a random fashion as is the typical method of prior-art data store mechanics. In still another preferred embodiment any data that is older than a reasonable and configurable time window will be securely and automatically purged.

The system of the present invention enables a client to allocate more disk space for primary storage and eliminates periodic data backup and archiving operations. In addition, data recovery back to any requesting host can be performed in a file-based, volume-based, or application-based manner that is transparent across operating systems and platforms. Still another benefit is that secondary storage space can be less than that used for primary storage or for normal secondary disks maintained in primary storage because of data compression techniques used.

One with skill in the art of network-based data storage will recognize that secondary storage system 208 may be provided as a CPE hardware/software system or as a CPE software solution wherein the client provides the physical storage and host machine for running the server application software. In one embodiment, system 208 may be provided as a remote service accessible over networks such as other LANs, MANs. WANs or SAN Islands.

In the latter case, instead of using physical path splitters, the system may access data directly from the primary storage system before writing to secondary storage. Some overhead would be required for the extra read operations performed by the system. In a preferred embodiment, the system is implemented as a CPE solution for clients. However that does not limit application to clients using a WAN-based SAN architecture of storage network islands. System 208 is scalable and can be extended to cover more than one separate SAN-based network by adding I/O capability and storage capability.

Figure 3:
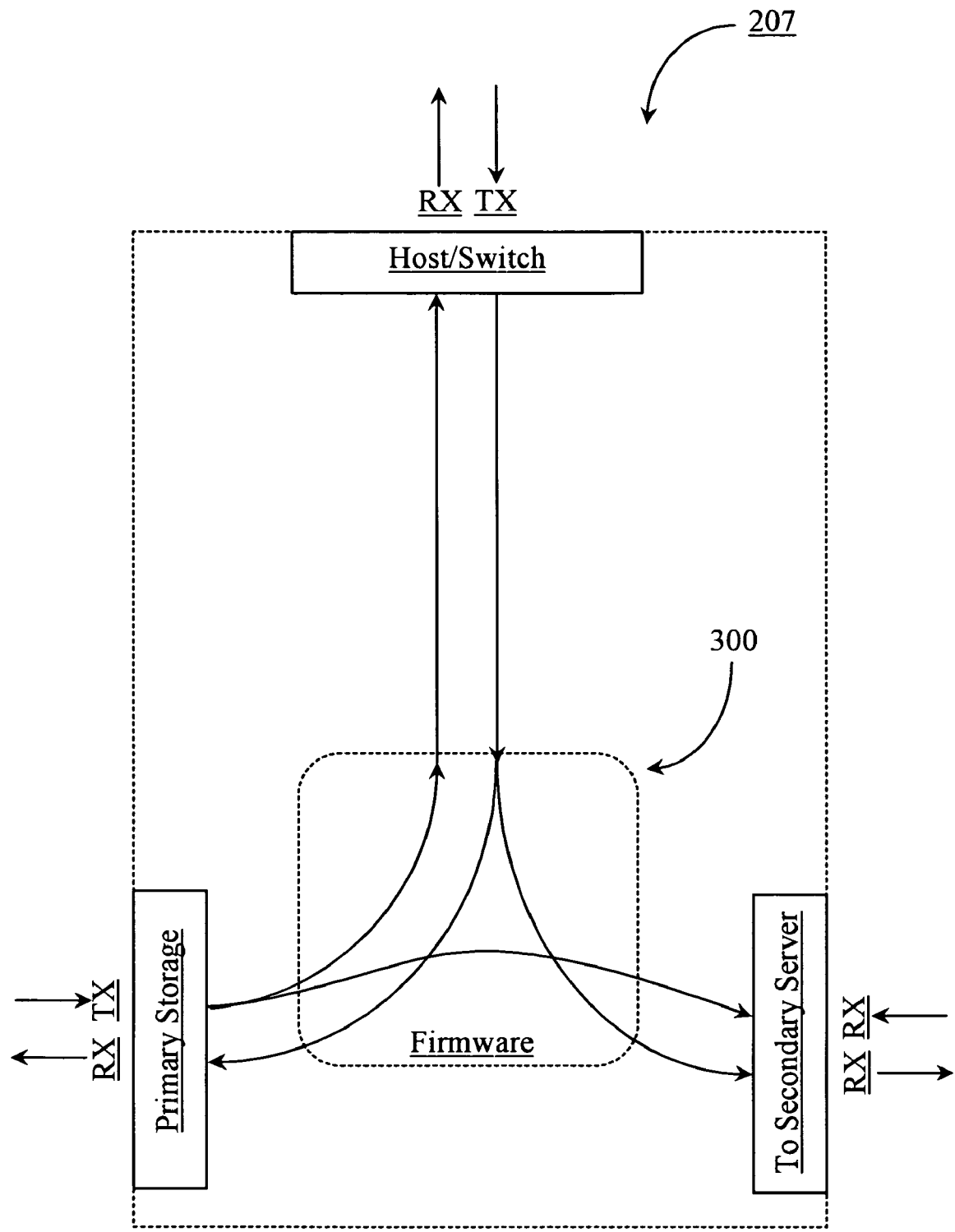
FIG. 3 is a block diagram illustrating data path splitting in the architecture of FIG. 2.

FIG. 3 is a block diagram illustrating data splitting as practiced in the architecture of FIG. 2. Data splitter 207 is in this example is an off-the shelf hardware splitter installed into each primary data path from a host/switch to the primary storage system. As such, splitter 207 has an RX/TX port labeled From Host/Switch, an RX/TX port labeled To Primary Storage, defining the normal data path, and an RX/RX port labeled To Secondary Server, leading to server 212 described with reference to FIG. 2 above. In a preferred embodiment each optical cable has two separate and dedicated lines, one for receiving data sent by the host/switch and one for receiving data sent by the primary storage subsystem. The preponderance of data flows from the switch in this example to primary storage and thereby to secondary storage.

Normal FC stack protocol is observed in this example including the request/response protocol for initiating and concluding a transaction between a host and a primary storage destination. Firmware 300 is illustrated in this example and includes all of the functionality enabling exact copies of each data frame received at the switch-side port and destined to the primary storage port to be split onto the secondary server-side port.

In this configuration both the primary storage and secondary storage systems can theoretically communicate independently with any host configured to the FC switch. Referring back to the example of FIG. 2, data mirroring to secondary storage may, in one embodiment, only be performed on the stream that is incoming from a host and destined to primary storage. However in another embodiment server 212 "sees" all communication in both directions of the primary data path hosting a splitter 207. In this way, server 212 can insure that an acknowledgement (ready to receive) signal of the FC handshake has been sent from primary storage to a requesting host so that server 212 "knows" the write has been successful. In this embodiment, no data writes are mirrored to secondary storage if they are not also written to primary storage.

In still another embodiment all data from a host to primary storage may not be split to secondary storage. In this embodiment firmware at the splitter is enhanced to mirror only data frames that include a payload or "write data" and, perhaps an associated ACK frame. In this way unnecessary data frames containing no actual write data do not have to be received at server 212.

Logical cable 209 represents a plurality of separate fiber optics lines that are ported to Line Cards (not shown) provided within server 212. More detail about line communication capability is provided later in this specification.

Figure 4:
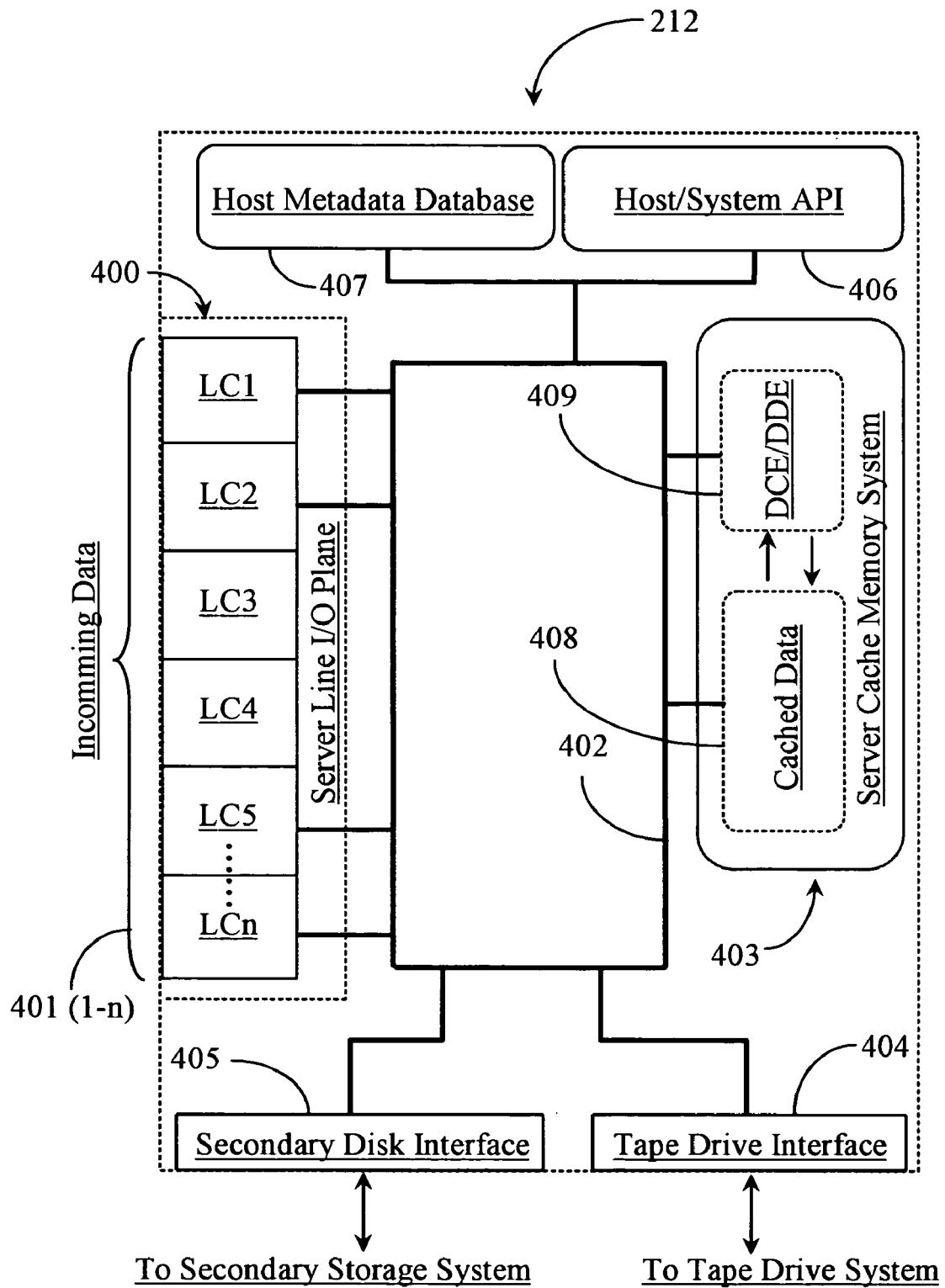
FIG. 4 is a block diagram illustrating components of the secondary storage and recovery server of FIG. 2 according to an embodiment of the present invention.

FIG. 4 is a block diagram illustrating components of secondary storage and recovery server 212 of FIG. 2 according to one embodiment of the present invention. Server 212 is, in this example, a dedicated data server node including just the hardware and software components necessary to carry out the functions of the present invention. Server 212 has a bank of line cards 400 including line cards (LC) 401 (1-n). Each line card 401 (1-n) has at least two RX ports and two possibly inactive TX ports configured to receive data from the assigned splitter or splitters 207 described with reference to FIG. 2 above. In one embodiment, one or more line cards 401 (1-n) may be dedicated for communication with FC switch 103 for the purpose of control signaling and error signaling and, perhaps direct communication with any host that is configured to FC switch 103.

In one embodiment of the present invention line cards 401 (1-n) may include a mix of standard HBAs that engage in two way data transfer and special dedicated cards provided by the inventor and adapted primarily only to receive incoming write data and to offload that data into a cache system represented herein by cache system 403. Each line card 401 (1-n) that is adapted to receive copied data from hosts has assigned to it the appropriate FC port (206*b*) including identified hosts (204) (1-n) that are assigned to the covered port for communication. The overall data load could be, in one embodiment, balanced among the available line cards 401 (1-n).

Server 212 has a high-speed server bus logically represented herein as bus structure 402. Bus 402 connects all necessary components together for communication within the server and to external components. A communication bus controller is not illustrated in the example, but may be assumed to be present. Each line card 401 (1-n) has a direct link to a server cache memory system 403 over logical bus 402. All data received on line cards 401 (1-n) that is considered read/write data is cached in one embodiment in cache memory system 403, the data represented herein by a block 408 labeled cached data. Data buffers and other components of cache system 403 and line cards 401 (1-n) are not illustrated but may be assumed to be present. More detail about a unique line card adapted for receiving data for secondary storage is provided later in this specification.

Server 212 has an I/O interface 405 to an external secondary storage disk or disk array analogous to storage disk 211 described with reference to FIG. 2 above. I/O interface 405 includes all of the necessary circuitry for enabling data writing to secondary storage from cache system 403 on a continuous streaming basis as data becomes available. In one embodiment data cache optimization is performed wherein redundant flames including read requests and, in one embodiment, redundant writes are deleted leaving only valid write data. In a preferred embodiment, elimination of redundant writes is a line card function physically carried out on designated cards 401 (1-n). In one embodiment the line cards 401 (1-n) can write directly to the secondary storage through the I/O interface 405 using a shared file system module provided for the purpose.

Server 212 has an I/O interface 404 to an external tape drive system analogous to tape drive system 210 described with reference to FIG. 2 above. Interface 404 includes all of the necessary circuitry for enable continuous writes to tape according to data availability for archiving long-term storage data. In one embodiment the I/O interfaces 404 and 405 can be one and the same.

Server 212 includes a host/system application program interface (API) 406 adapted to enable communication to any LAN-connected host bypassing the FC architecture over a separate LAN communication link analogous to link 215 described with reference to FIG. 2. Interface 406 may, in one embodiment, be used in data recovery operations so that recovery data does not have to be conducted through a primary host-to-storage data path exclusively.

Server 212 also has internal storage memory 407, which in this case is adapted to store metadata about data frames that are written to secondary storage and used by certain LCs 401 (1-n) to validate that a particular write carries data that has changed from a last data write to related data. The metadata includes but is not limited to host ID, a destination ID (LUN ID), an offset location in primary storage allocated for the pending write, and the length value of the payload.

Host nodes 204 (1-n), in one embodiment create the metadata sets with the aid of CL instance 213 described with reference to FIG. 2 when frames having write payloads are packaged for send through FC switch 103 to primary storage. The metadata can be sent either through the SAN or the LAN and is received at server 212 after the associated data frames. Each metadata set received is compared at least by payload length, and offset location to metadata sets previously received from a same host during a work period. Server 212 may, in one embodiment create hash values of metadata fields for use in a data search of a centrally located database containing all of the host metadata. In this embodiment the CL instance 213 may also create a hash value from the metadata set and exchange it with Server 212 as a faster way of matching metadata sets.

A hit, as described further above, indicates that the pending write as a duplicate payload already stored for the originating host or for another host or hosts. In this embodiment, redundant write flames can be eliminated onboard a LC without consulting database 407. For example, a limited amount of metadata may be retained for a specified period after it is received to any line card 401. This near-term metadata on a single line card describes only the data writes previously performed by hosts that are configured to the data path of that card. Metadata on other cards describes data sent by the hosts configured to those cards.

In another embodiment, metadata about data writes is generated at a line card analogous to the one described further above as the data is received from splitter 206*a* instead of at the host. In this embodiment, the generated metadata is immediately compared with previously generated and stored metadata either on board or in conjunction with an off-board database.

Although not preferred, it is possible to send generated metadata lists to LAN hosts so that metadata generated at a LAN host can be compared locally before writes are completed. In this aspect redundant saves may be prevented from entering the primary data path.

In a preferred embodiment only change data written and sent for write from hosts 204 (1-n) to primary storage is stored in secondary storage. In this embodiment data changes are also held separately as revisions from previous changes to a same volume of data. The purpose of this is to provide revision selectable and time-based recovery of data. In prior art systems old data is typically overwritten by new data including the change data and recovery is limited to recovery of the latest saved version of any data file.

Data changes are stored in disk 212 separately but linked to the relevant data block or blocks that the new revisions or versions apply to. Each time a new revision of data is recorded, it is also time stamped so that a host wishing to recover a specific version of a file, for example can select a desired time-based version or versions of a single file. In this way no data is lost to a host machine because it was over written by a later version of the same data.

Cache system 403 has a data compression/decompression engine (DCE/DDE) 409 provided therein for the purpose of compressing data before writing the data to secondary storage disk (211). In a preferred embodiment write data is prepared with a sparse file utility and then compressed before writing the data sequentially to storage disk 211. This technique enables more disk area to be utilized and with sequential storage, enables faster retrieval of data for recovery purposes. In one embodiment the DCE/DDE can be embedded with the line cards 401 (1-n). In one embodiment, when data is served to one or more hosts during near term recovery (up to 30 days) it may be retrieved and served in compressed format. CL 213 running on host machines may, in this case, be adapted with a decompression engine for the purpose of decompression and access to the recovered data locally. This embodiment may be practiced for example, if volume recovery is requested over an IP connection or across a LAN network. In one embodiment, data streamed to tape drive (211) is decompressed and rendered in a higher-level application file format before transfer to storage tape for long-term archiving. In a preferred embodiment, data offload to tape is an automated process that runs on a schedule that may consider the amount of time data has remained in secondary storage. In another embodiment tape archiving is triggered when a physical storage limit or a time based policy condition has been reached.

Figure 5A:
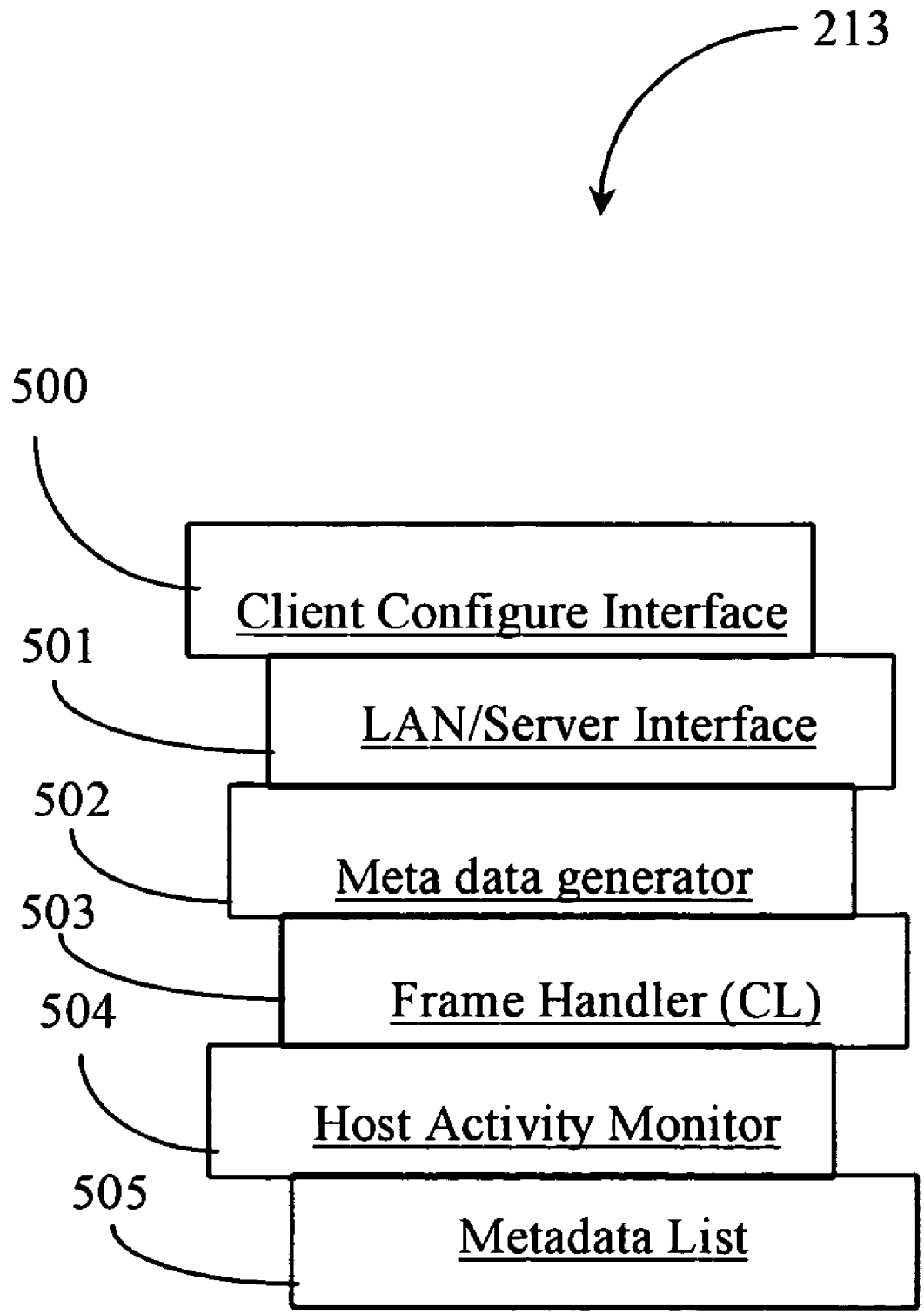
FIG. 5A is a block diagram illustrating client SW components of the SW of FIG. 2 according to an embodiment of the present invention.

FIG. 5A is a block diagram illustrating client SW components of client 213 of FIG. 2 according to an embodiment of the present invention. CL 213 has a client configure interface 500 enabling a LAN or remote network connection to and communication with server 212 described with reference to FIG. 4 for purpose of configuring a new LAN host to the system. This interface may be of the form of a Web browser interface that may also include a remote LAN to server interface 501 for manual configuration. Any LAN host may be configured or through an intermediate server as to what type and scope of data backup the host will practice. This consideration may very according to task assignment from backup of all generated data to only certain types of critical data.

In one less preferred embodiment CL 213 has a shared metadata list 505 for the purpose of checking if pending writes that may be redundant writes. In another embodiment a metadata-generating utility 502 is used to create metadata descriptions of each pending write that has been approved for the host. In this case, the metadata are associated to the frames containing the payload data and sent with each physical data frame by a frame or file handler 503. In another embodiment metadata generated is sent to the system host server (212) via LAN, bypassing the FC switch (193).

SW 500 may include, in one embodiment, a host activity monitor 504 that is provided and adapted to monitor host activity including boot activity and task activity. It may be that a host is running more than one application simultaneously and saving data generated by the separate applications as work takes place within the host. Monitor 504 is responsible for spawning the appropriate number of metadata generation utility instances 502 for the appropriate tasks occurring simultaneously within the host if the host is configured to generate metadata.

In another embodiment, CL SW 500 is kept purposely light in terms of components, perhaps only containing a configure interface, a LAN to server link, and an activity monitor. In this case the application and OS of the LAN host works normally to save data changes and the metadata is generated and compared on the server side of the system. There are many possibilities.

Figure 5B:
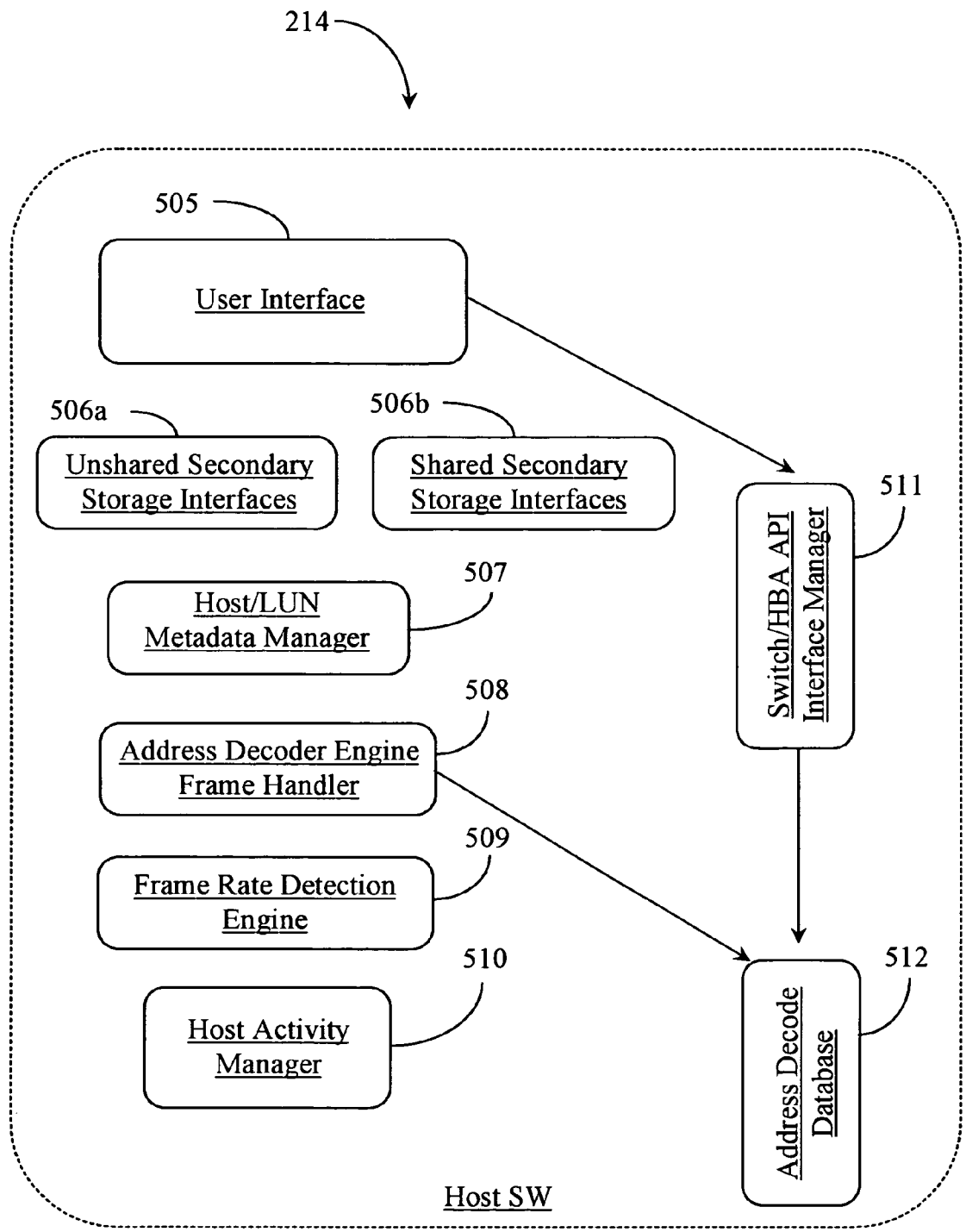
FIG. 5B is a block diagram illustrating components of the host SW of FIG. 2 according to an embodiment of the present invention.

FIG. 5B is a block diagram illustrating components of host SW 214 of FIG. 2 according to an embodiment of the present invention. SW 214 may be a mix of server software and line card firmware without departing from the spirit and scope of the present invention. SW 214 has a user interface 505 adapted for enabling remote configuration of LAN or WAN host machines that will have data backed up to near and long-term storage.

Interface 505 can be accessed via LAN or WAN connection and in some embodiments through a master server or intermediate server acting as a master server for distributed system sites. SW 214 has a switch HBA API interface 511 for enabling communication between the system (server 212) and an FC switch analogous to switch 103. In one embodiment interface 511 may be adapted for interface to an Ethernet switch.

SW 214 has a pair of secondary storage interfaces 506a and 506b, which are optionally adapted to enable either shared write capability or unshared write capability to secondary storage from the server. Interface 506a is optional in an embodiment wherein one or more specially adapted line cards in the server are enabled to compress and write data directly to secondary storage from an onboard cache system thereby bypassing use of a server bus. In this case unshared implies that each line card adapted to write data to secondary storage may do so simultaneously and independently from one another.

In one embodiment all data writes to secondary storage are performed by the host server from a server cache memory. In this case interface 506b (shared) is used. All line cards adapted to send data to secondary storage in this case send their data onto a PCI or other suitable type of server bus (shared) into a server cache memory from whence the data is compressed and then written into secondary storage (disk 211).

SW 214 has a host/LUN metadata manager utility 507 adapted either as a piece of software running on the server, or as distributed instances of firm ware running on line cards responsible for writing or sending their data for write into secondary storage. Manager utility 507 functions in one embodiment to compare metadata about physical data received in line with previous metadata sent from a same host to check for redundant writes against the same host and against writes performed by other hosts as well. In this way only valid changes are secured to the secondary storage media.

In another embodiment manager utility 507 is also adapted to generate metadata for comparison from data received from the data splitting junction for each line card. In this embodiment, the generated metadata is immediate compared with host metadata either onboard the line card or in conjunction with a server database containing a specific amount of metadata from all configured hosts. In one embodiment metadata is received at the server from hosts via LAN or WAN link and is not received by a line card from the FC switch. In this case the line card is adapted only to receive data from the split in the designated primary data path between a host and primary storage. Metadata lists generated at host machines can be exchanged periodically with server 212 off-board from line cards.

SW 214 has a frame handler with an address decoder engine 508 adapted, in a preferred embodiment as firmware installed on line cards adapted to receive data changes from host machines through the suitable split data path. Utility 508 works in conjunction with a configurable address decode database 512, which is adapted to retain host machine address information such as IP or MAC address depending on the network protocol used. Decode database 512 is populated through user interface 505 and interface manager 511. Configuration then provides both the home network information of a host and the FC or Ethernet port assignments and splitter address (if required).

Decoder engine 509 is responsible for decoding incoming data flames so that payloads for write may be properly identified. LUN destination, source destination, payload length, timestamp information, splitter ID (if required), and other information is provided from decoding incoming frames.

In one embodiment of the present invention, SW 214 has a frame rate detection engine 509 adapted as a distributed firmware component installed on each line card adapted for backup duties. The purpose of detecting frame rate is to enable proper adjustment of buffer load and speed according to the actual data speed over the link. A host activity manager 510 is provided and adapted to log host activity reported by a client component residing on the host or by actual data activity occurring on a line card assigned to the host.

Software 214 may contain additional components not mentioned in this example without departing from the spirit and scope of the present invention. Likewise some components illustrated may not be required such as the host activity manager 510, or one of the secondary storage interface types. SW 214, in a preferred embodiment, resides at least partially in the form of distributed firmware on special line cards provided by the inventor and dedicated to receive and process data incoming from the primary data path via optical splitter.

Figure 6:
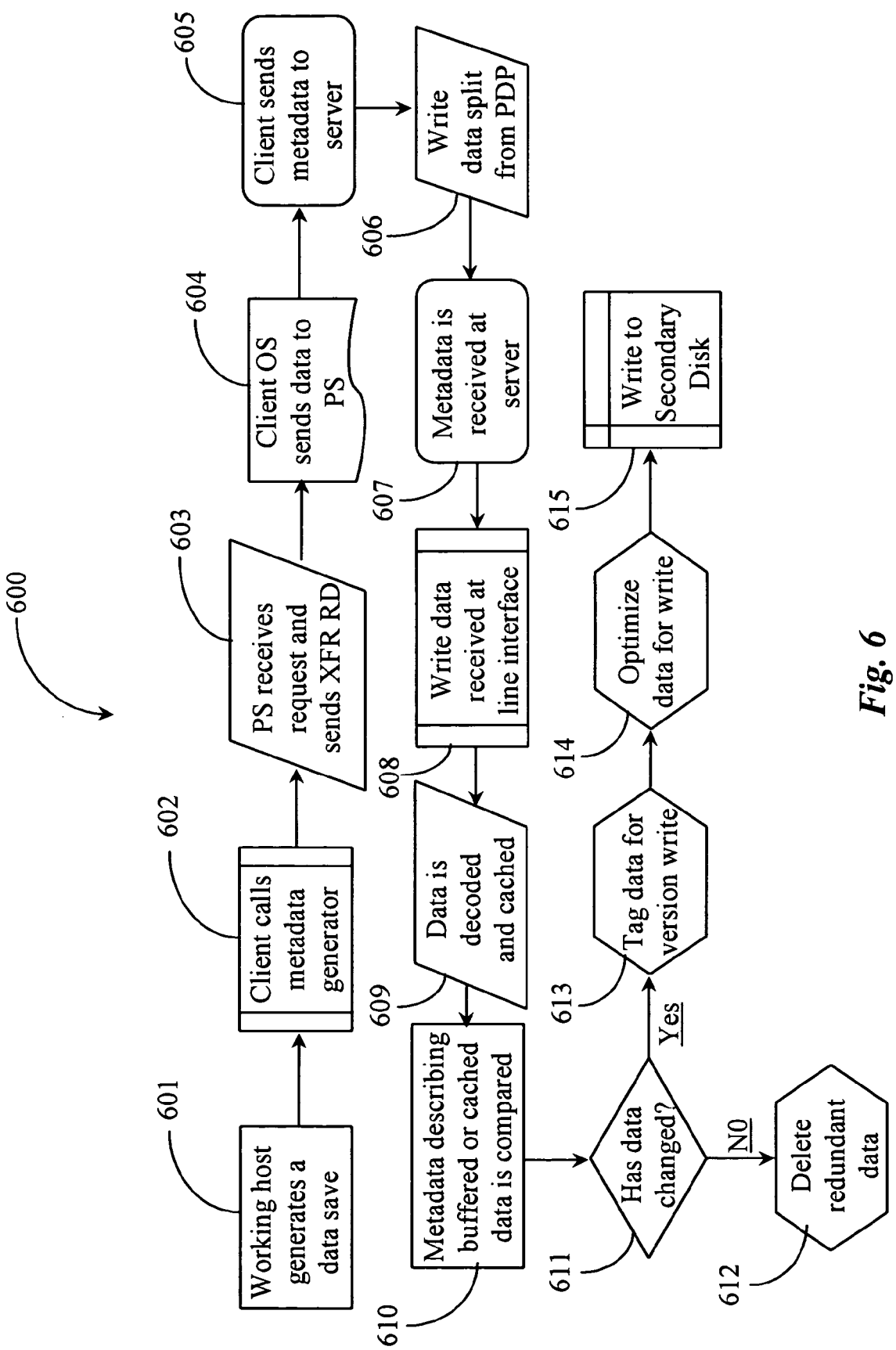
FIG. 6 is a flow chart illustrating a process for writing data to secondary storage according to an embodiment of the present invention.

FIG. 6 is a flow chart 600 illustrating a process for sending change data and writing the change data to secondary storage according to an embodiment of the present invention. At step 601 a LAN host analogous to one of hosts 204 (1-n) described above generates a data save operation (s). It will be appreciated by one with skill in data transfer that data sent from any host is sent as soon as it is physically "saved to disk" at the host. In one embodiment, replication is preformed if the host uses a local drive but is configured to send data changes through the FC switch to PS. At step 602, in one application, metadata describing parameters of the change data are generated by the client SW (213). CL 213 is configured to consider that each save operation performed by a host is a potential data write to primary storage although at this point it is not clear that it is a write containing change data. Therefore, each save made by an application working with files or other data whose data is to be backed up, is considered a write request, which must be initiated from the point of a host and must be acknowledged by the primary storage system before any writes are actually sent.

At step 603, the primary storage system receives a request from the client OS and sends an XFER RD (equivalent to acceptance of the request) back to the OS to get ready for the data transmission over the primary data path. It is noted herein that the request and confirmation of the pending transmission are visible on the assigned line card designated to receive data split from the primary data path (PDP).

In one embodiment of the present invention wherein the secondary storage system (208) is remote from the operating LAN or WAN over IP, data replication is used over IP tunneling protocols or other suitable transport protocols to send the exact data copies of data generated by one or more hosts to the secondary storage system server.

At step 604, the host, or client OS then sends the data over the PDP. The transmission is responded to by acknowledge and completion status packets. In one embodiment, these packets are used by server 212 to guarantee fidelity of writes to the secondary storage system by making sure that the writes to primary storage (PS) actually happened before storage space is allotted and writes are committed to the secondary storage.

In one embodiment, at step 605 CL (213) residing on the sending host generates metadata describing frames carrying a payload for write during a session with primary storage. The metadata describes aspects of the actual data frames it is associated with. For example, the host ID on the LAN and the destination device ID or LUN number is described. The offset position allocated by primary storage (received in ACK) is described. The frame sequence numbers are described, and the actual length of the data payload of the frame or frames is described.

At step 605, the metadata, if generated by the client, is preferably sent over LAN, WAN, or other link to server 212 and not over the PDP between the client machine and the PS system. The metadata of step 605 may describe all of the data "saved" and not just the changed data (if any). Moreover, the metadata may be continuously or periodically shared with server 212 from the client OS. The metadata is compared to previous metadata generated by the client to isolate "changed data" received at the server line interface.

In another embodiment metadata is not generated in step 602 or sent to server 212 in step 605, rather, metadata is generated at server side, more particularly at the specific line interface receiving the data split from the PDP. In this case change data is isolated at server side by comparing recent metadata against a metadata database. Metadata "hits" describing a same LUN, payload length, source address, offset location, etc., are considered redundant writes or duplicate writes that contain no new information. In this way processing is reduced.

At step 606, the data sent over the PDP by the client machine is transparently split from the path onto a path leading to server 212 and a receiving line card. It is noted herein that data frames having no payload and therefore not considered a potential write may be ignored from the perspective of secondary storage caching.

At step 607, the latest metadata describing the saved data is received at server 212 either in server cache, or in one embodiment, to a special memory allocated for the purpose. In another embodiment the metadata may be routed through the server to the appropriate line card that received the latest "save" data from the same client machine.

At step 608, data split from the PDP is received at the appropriate line interface. It is possible that a single line interface will process frames from multiple client machines. Proper frame decoding is used to identify and segregate data frames.

At step 609 data received at step 608 is decoded and cached. Data caching may involve offloading into a server cache. In one embodiment data caching may be performed onboard the line interface wherein the line interface has a capability for writing directly to secondary storage as described further above. In the latter case metadata comparison may also be performed onboard without using server resources. The metadata database could be carried onboard to a limited extent.

In either embodiment (line card based; server cache based), at step 610 the metadata describing the latest "save data" for the client is compared against previous metadata stored for the client. The comparison "looks" for hits regarding source ID, LUN ID, payload length; checksums value, and offset location allocated for PS to identify redundant frames or frames that do not contain any changed data in their payload portions.

At step 611 the system determines for the preponderance of frames cached for write whether data has actually changed from a last "save" operation performed by the client. For each frame payload, if data has not changed then the data is purged from cache and is not written to secondary storage in step 612. At step 611 if it is determined for any frames that the payload has changed (is different), then at step 613, those data units are tagged for write to secondary storage.

At step 614, those data units of the "save session" that are considered valid writes reflecting actual changed data are further optimized for storage by using a sparse file utility to create sparse files for saving storage space and faster near-term data recovery along with a compression algorithm to further compress the data. At step 615 the data is sequentially written to the secondary storage media analogous to disk 211 described with reference to FIG. 2 above.

At step 615, the existing data that would normally be overwritten with the new data is not overwritten. Rather, the change data is recorded as a time-based revision of the original file (viewing from an application level perspective). Similarly as new data changes arrive for the same data file, they too are recorded separately from the previous change. In this way file-based and time-based recovery services may be offered wherein the client can browse the number of revised versions of a same file, for example, and recover only the version or versions desired.

Data on the secondary storage system is viewable as volume block data, file system data, and application level data. It is also recoverable in the same views. Primary storage offset locations will be different than secondary storage offset locations. However, communication capability between the disk storage systems enables synchronizing of positions so that one may be directed to the exact writer or read position in either system from the domain of either system.

One with skill in the art will appreciate that the secondary storage system of the present invention may be applied locally as a self-contained CPE solution or as a remotely accessible service without departing from the spirit and scope of the present invention. Performance of the primary data channels between host nodes and primary storage are not taxed in any way by the secondary storage system. Much work associated with manually directed backup operations as performed in prior art environments is eliminated.

Figure 7:
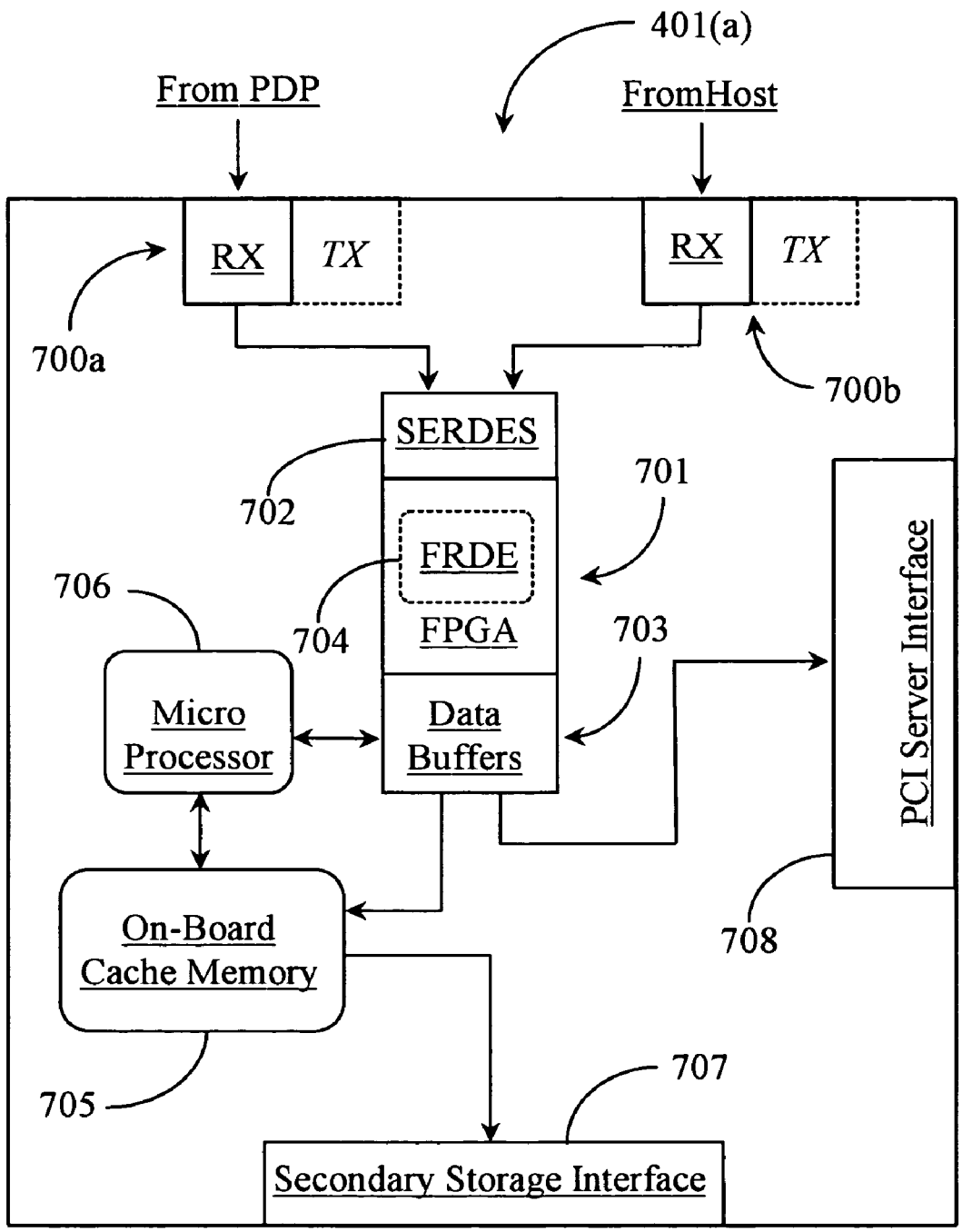
FIG. 7 is a block diagram illustrating components of one of line cards of FIG. 4 according to an embodiment of the present invention.

FIG. 7 is a block diagram illustrating components of one of line cards 401(1-n) of FIG. 4 according to an embodiment of the present invention. Line card (LC) 401 (1) can be any one of cards 401 that are dedicated for receive only of split data from PDPs. The designation 401(1) is arbitrary.

Card 401(1) may hereinafter be referred to simply as card 401. Card 401 has an RX port 700a capable of receiving data transparently split from a PS system analogous to the PS system (D1-Dn) of FIG. 2 above. It is noted that card 401 cannot send data to the PS through the splitter onto the PDP. Card 401 also has an RX port 700b capable of receiving data transparently spit from a client machine or LAN host analogous to one or more of hosts 204 (1-n) of FIG. 2. Similarly, card 401 cannot send data to any host through the splitter onto the PDP. The incoming lines are one way only so that data splitting is completely passive.

In one embodiment card 401 is fabricated from the ground up to include only RX ports specially adapted to receive split data. In another embodiment a generic card blank is used but the TX port circuitry is disabled from sending any data.

A Field Programmable Gate Array (FPGA) 701 is provided to card 401 and is adapted among other purposes for maintaining proper data rate through card 401 into cache and to secondary storage. FPGA 701 is associated with a serializer/de-serializer (SERDIES) device 702, which are known in the art and adapted for serializing and de-serializing data streams in data streaming devices. Device 702 de-serializes the data stream incoming from RX ports 700a and 700b for analysis and buffer loading.

Card 401 has a data buffer or buffers provided thereto and adapted to hold data incoming from a splitter for processing. Data is streamed into card 401 and streamed out to secondary storage in near real time. That is to say that all data changes from hosts for write to secondary storage are processed from an incoming stream and offloaded in an outgoing stream for write to secondary storage.

In a streaming embodiment it is important to know the current data rate of incoming data so that processing data buffering and data outflow runs smoothly without overloading or under utilizing the data buffers and without having to discard any important data frames. Card 401 can only receive data from the splitter so it has no physical link control. Therefore, a method has to be implemented for deducing the actual data rate of the incoming stream and for fine-tuning the processing and buffer performance accordingly.

FPGA 701 has a frame rate detection engine (FRDE) 704 installed therein through firmware programming. FRDE 704 uses PLL and other technologies to fine-tune SERDIES performance, buffer performance and other internal data processing streams to a stable and constant data rate deduced through PLL methods.

Card 401 has a microprocessor 706 provided thereto and having processing access to data residing in buffers 703. Processor 706 performs metadata comparison in one embodiment where it is practiced onboard rather than off-board using the server CPU. Processor 706 may also perform frame decoding, address decoding, data compression and data writing functions in one embodiment utilizing an onboard cache memory 705.

Card 401 has a secondary storage interface 707 analogous to the unshared interface 506a of FIG. 5B and a PCI server interface 708 analogous to the shared interface 506b of the same. Each interface is optional as long as one is used. Cache memory 705 is also optional in one embodiment. In another embodiment all described components and interfaces are present n card 401 and may be programmed for optional use states either offloading data from buffers through the server interface onto a server bus and into a server cache for further processing, or by emptying buffers into cache 705 for further processing and direct writing through interface 707 to secondary storage bypassing server resources altogether.

The present invention is not limited to SCSI, FC, or SAN architectures. DAS and NAS embodiments are possible wherein FC switches or Ethernet Hubs between separate networks are not required. Likewise, several SANs connected by a larger WAN may be provided secondary storage and recovery services from a central network-connected location, or from a plurality of systems distributed over the WAN. VIP security and tunneling protocols can be used to enhance performance of WAN-based distributed systems.

The methods and apparatus of the present invention should be afforded the broadest possible interpretation in view of the embodiments described. The method and apparatus of the present invention is limited only by the following claims.

What is claimed is:

1. A system to provide secondary data storage and recovery services to at least one networked host node storing data in an array of primary storage devices each coupled to the at least one host node by dedicated data paths, comprising:

a host node to connect at least one of a primary storage device and a secondary storage subsystem to a network to acquire data;

the primary storage to store the data generated by the host node;

the secondary storage subsystem including a server executing a server application managing data backup and recovery services by the secondary storage subsystem, wherein the secondary storage subsystem is comprised of at least one of a dedicated server node and a PC node, and wherein the data is received by at least one of a specially adapted line card installed in the secondary storage subsystem and a network adaptor card; and at least one data path splitter installed one per dedicated data path existing between the at least one host and the primary storage device, wherein the splitter mirrors data transmitted in the dedicated data paths, and streams the mirrored data to the secondary storage subsystem, wherein the data path splitter is comprised of a hardware data splitter of at least one of an optical type and an electrical type, depending on the type of network line used.

2. The system of claim 1 wherein the networked host nodes are connected to a local area network (LAN).

3. The system of claim 2 implemented in conjunction with a storage area network (SAN) and the LAN hosts through a fibre channel switch.

4. The system of claim 2 implemented in conjunction with a SAN and the LAN hosts through an Ethernet hub.

5. The system of claim 1 wherein the host nodes are a mix of personal computers (PCs) and server nodes.

6. The system of claim 1 wherein the secondary storage medium is one of a serial-advanced-technology-attachment (SATA) or parallel-advanced-technology attachment (PATA) drive system.

7. The system of claim 1 further comprising a client application, wherein the client application includes a component for creating and sending metadata along with physical data for secondary storage backup.

8. The system of claim 7 wherein the server application includes a component for receiving data from a data acquisition mechanism, a component for validating the write portion of the data received using metadata comparison of received metadata with stored metadata, and a component for compressing the validated data for write to the secondary storage medium.

9. The system of claim 8 wherein the component for receiving data from the data acquisition mechanism is a line card dedicated as receive only.

10. The system of claim 1 further including a tape-drive system for long term backup of secondary storage data.

11. The system of claim 1 wherein a host node is comprised of a data path splitter.

12. The system of claim 1 further comprising a cache memory system of a hardware host used to prepare data to store in secondary storage.

13. The system of claim 1 wherein data stored in secondary storage is converted using at least one of a sparse file utility and a compression algorithm.

14. The system of claim 1 wherein a portion of the server application comprises firmware installed on a field programmable gate array (FPGA) supported by a line card, and wherein the firmware includes a frame rate detection engine to adjust performance of the line card to an actual frame rate of data being received on the line card.

15. The system of claim 1 wherein the server application is comprised of server software and line card-based software.

16. The system of claim 1 wherein data stored in secondary storage is viewable as volume block data, file system data, and application level data.

17. The system of claim 1 wherein a data change is stored in secondary storage as a distinct and time stamped version from other changes to a data block to provide revision selectable and time-based recovery of data.

18. The system of claim 1 further comprising a host activity monitor to track boot and task activity.

19. The system of claim 1 further comprising a metadata generation utility instance to generate metadata associated with a task occurring within the at least one networked node.

20. The system of claim 1 wherein a metadata comparison is performed at a host prior to completion of a write operation to prevent a redundant save.

21. The system of claim 1 wherein metadata is created in a host and is received by the secondary storage subsystem after an associated data frame.

22. The system of claim 1 wherein the system to provide secondary data storage and recovery services is provided as a remote service accessible over a network.

23. A method of configuring at least one networked host node to provide secondary data storage and recovery services, wherein the at least one networked host node stores data in an array of primary storage devices each coupled to the at least one host node by dedicated data paths, the method comprising:

configuring a secondary storage sub-system including a server executing a server application managing data backup and recovery services by the secondary storage subsystem, wherein the secondary storage sub-system is comprised of at least one of a dedicated server node and a PC node, and wherein the data is received by at least one of a specially adapted line card installed in the secondary storage sub-system and a network adaptor card; and configuring at least one data path splitter installed one per dedicated data path existing between the one or more hosts and a primary storage device, wherein the splitter mirrors data transmitted in the dedicated data paths, and streams the mirrored data to the secondary storage subsystem, wherein the at least one data path splitter is comprised of at least one hardware data splitter of at least one of an optical type and an electrical type, depending on the type of network line used.

24. The method of claim 23, wherein the networked host nodes are connected to a local area network (LAN).

25. The method of claim 23, wherein the host nodes are a mix of personal computers (PCs) and server nodes.

26. The method of claim 24, implemented in conjunction with a storage area network (SAN) and the LAN hosts through a fibre channel switch.

27. The method of claim 24, implemented in conjunction with a SAN and the LAN hosts through an Ethernet hub.

28. A method comprising:

providing secondary data storage and recovery services to at least one networked host node storing data in an array of primary storage devices each coupled to the at least one host node by dedicated data paths;

executing a server application managing data backup and recovery services using a secondary storage subsystem including a server; wherein a secondary storage subsystem is comprised of at least one of a dedicated server node and a PC node, and wherein the data is passively received by at least one of a specially adapted line card installed in the secondary storage subsystem and a network adaptor card;

mirroring data transmitted on a dedicated data path existing between the at least one host and a primary storage device using at least one splitter installed one per dedicated data path, wherein the at least one data path splitter is comprised of at least one hardware data splitter of at least one of an optical type and an electrical type, depending on the type of network line used.; and streaming the mirrored data to the secondary storage subsystem.

29. The method of claim 28 wherein the networked host nodes are connected to a local area network (LAN).

30. The method of claim 28 wherein the host nodes are a mix of personal computers (PCs) and server nodes.

31. The method of claim 29, implemented in conjunction with a storage area network (SAN) and the LAN hosts through a fibre channel switch.

* * * * *